United States Patent
Shur et al.

(10) Patent No.: US 7,619,263 B2
(45) Date of Patent: Nov. 17, 2009

(54) METHOD OF RADIATION GENERATION AND MANIPULATION

(75) Inventors: Michael Shur, Latham, NY (US);
Victor Ryzhii, Aizu-Wakamatsu (JP);
Remigijus Gaska, Columbia, SC (US)

(73) Assignee: Sensor Electronic Technology, Inc., Columbia, SC (US)

(*) Notice: Subject to any disclaimer, the term of this patent is extended or adjusted under 35 U.S.C. 154(b) by 533 days.

(21) Appl. No.: 10/696,693

(22) Filed: Oct. 29, 2003

(65) Prior Publication Data

US 2004/0201076 A1 Oct. 14, 2004

Related U.S. Application Data

(60) Provisional application No. 60/461,100, filed on Apr. 8, 2003.

(51) Int. Cl.
*G02F 2/00* (2006.01)
(52) U.S. Cl. ............................. 257/198; 257/E29.246
(58) Field of Classification Search ............... 257/462, 257/460, 461, 10, 22, 198, E29.246; 385/14, 385/1, 2, 3, 131, 132; 398/187
See application file for complete search history.

(56) References Cited

U.S. PATENT DOCUMENTS

| | | | | |
|---|---|---|---|---|
| 4,236,124 A | * | 11/1980 | Rockwood | 372/96 |
| 4,989,052 A | * | 1/1991 | Okada et al. | 257/194 |
| 5,371,388 A | * | 12/1994 | Oda | 257/194 |
| 5,468,972 A | * | 11/1995 | Yamada | 257/10 |
| 5,705,847 A | * | 1/1998 | Kashiwa et al. | 257/476 |
| 5,729,017 A | * | 3/1998 | Brener et al. | 250/338.1 |
| 5,767,969 A | * | 6/1998 | Chevalier | 356/461 |
| 6,178,275 B1 | * | 1/2001 | Nerses et al. | 385/14 |
| 6,269,199 B1 | * | 7/2001 | Maloney | 385/14 |
| 6,720,589 B1 | * | 4/2004 | Shields | 257/194 |
| 2003/0016716 A1 | * | 1/2003 | Mahonty | 372/55 |

OTHER PUBLICATIONS

Nabet et al., "Heterojunction and heterodimensional devices for optoelectronics," Microwave Magazine, IEEE, vol. 2, Issue 1, Mar. 2001 pp. 40-45.*

Muller and Kamins, "Device Electronics for Integrated Circuits," (John Wiley, New York, 1977). p. 257.*

Sohn et al., "Tunable terahertz generation using femtosecond pulse shaping," Appl. Phys. Lett. vol. 81 p. 13 (2002).*

Ryzhiia et al., "Terahertz photomixing in quantum well structures" J. App. Phys. vol. 91 p. 1875 (2002).*

Peralta et al., "Terahertz photoconductivity and plasmon modes in double-quantum-well field-effect transistors" Appl. Phys. Lett. vol. 81 p. 1627 (2002).*

(Continued)

*Primary Examiner*—Thomas L Dickey
(74) *Attorney, Agent, or Firm*—John W. LaBatt; Hoffman Warnick LLC

(57) ABSTRACT

A method of managing radiation having a frequency in the terahertz and/or microwave regions. The method comprises providing a semiconducting device having a two-dimensional carrier gas. Plasma waves are generated in the carrier gas using a laser pulse. The frequency of the plasma waves, and as a result, the generated radiation are adjusted using a voltage applied to the semiconducting device.

19 Claims, 8 Drawing Sheets

OTHER PUBLICATIONS

Sarukura et al, "Submilliwatt, short-pulse, terahertz radiation from femtosecond-laser irradiated InAs in a magnetic field", Lasers and Electro-Optics, 1998. CLEO 98. Technical Digest: Summaries of papers presented at the Conference on May 3-8, 1998, p. 63.*

"Pioneering the Blue Spectrum," Compound SemiNews, Jun. 11, 2003 (http://www.compoundsemi.com/news/pdf/blue2003pioneers.pdf).*

"New record for stimulated emission in AlGaN/AlN" compoundsemiconductor.net, Nov. 25, 2002 (http://compoundsemiconductor.net/cws/article/news/16457).*

"Trying to Put New Zip Into Moore's Law" New York Times, Feb. 28, 2008 (http://www.nytimes.com/2008/02/24/business/24proto.html?_r=1&th).*

"Coherent THz Emission in Semiconductors," Semiconductors and Semimetals,Chapt. 8, vol. 67, 2001, pp. 389-440.

"Conductance of Small Semiconductor Devices," A. A. Kastalsky et al. Solid State Comm., vol. 39, No. 6, 1981, pp. 107-114.

"Impedance of Thin Semiconductor Films in Low Electric Field," K. Lee et al., Journal of Applied Physics, vol. 54, No. 7, Jul. 1983, pp. 4028-4034.

"Ballistic Transport in High Mobility Semiconductors," M. I. Dyakonov et al., The Physics of Semiconductors, 1996, pp. 145-148.

"Ballistic Transport in a Semiconductor with Collisions," M. Shur, IEEE Transactions on Electron Devices, vol. ED-28, No. 10, Oct. 1981, pp. 1120-1130.

"Detection, Mixing, and Frequency Multiplication of Terahertz Radiation by Two-Dimensional Electronic Fluid," M. Dyakonov et al., IEEE Transactions on Electron Devices, vol. 43, No. 3, Mar. 1996, pp. 380-387.

"Shallow Water Analogy for a Ballistic Field Effect Transistor: New Mechanism of Plasma Wave Generation by dc Current," M. Dyakonov et al., Physical Review Letters, vol. 71, No. 15, Oct. 1993, pp. 2465-2468.

"Plasma Wave Electronics," M. Shur et al., Terahertz Sensing Technology, vol. 1: Electronic Devices and Advanced Technology, 2003.

"Possible Crystallization of Charge Carrier in Low-Density Inversion Layers," A. V. Chaplik, Soviet Physics JETP, vol. 35, No. 2, Aug. 1972, pp. 395-397.

"Theory of Surface Waves Coupled to Surface Carriers," M. Nakayama, Journal of the Physical Society of Japan, vol. 36, No. 2, Feb. 1974, pp. 393-398.

"Preface: High Speed Integrated Circuit Technology, Towards 100 GHz Logic," M. J. W. Rodwell, World Scientific, http://www.worldscinet.com/ijhses/11/1101/S0129156401000769.html, pp. 1-2.

"Observation of the Two-Dimensional Plasmon in Silicon Inversion Layers," S. J. Allen, Jr. et al., Physical Review Letters, vol. 38, No. 17, Apr. 1977, pp. 980-983.

"Far Infrared Emission from Plasma Oscillations of Si Inversion Layers," D.C. Tsui et al., Solid State Communications, vol. 35, 1980, pp. 875-877.

"High Frequency Conductivity of the High-Mobility Two-Dimensional Electron Gas," P. J. Burke et al., Applied Physics Letters, vol. 76, No. 6, Feb. 2000, pp. 745-747.

"A Resonant Terahertz Detector Utilizing a High Electron Mobility Transistor," J-Q. Lu et al., IEDM '98 Technical Digest, 1998, pp. 453-456.

"Resonant Detection of Subterahertz Radiation by Plasma Waves in a Submicron Field-Effect Transistor," W. Knap et al., Applied Physics Letters, vol. 80, No. 18, May 2002, pp. 3433-3435.

"Terahertz Photoconductivity and Plasmon Modes in Double-Quantum-Well Field-Effect Transistors," X. G. Peralta et al., Applied Physics Letters, vol. 81, No. 9, Aug. 2002, pp. 1627-1629.

"Ballistic FET as Tunable Terahertz Oscillator," M. Dyakonov et al., Proceedings of 2d International Semiconductor Device Research Symposium, Charlottesville, VA, Dec. 1993, pp. 741-744.

"Terahertz GaAs Devices and Circuits for Heterodyne Receiver Applications," T. Crowe et al., Compound Semiconductor Electronics The Age of Maturity: Selected Topics in Electronics and Systems, vol. 4, 1996, pp. 209-245.

"Materials for Terahertz Science and Technology," B. Ferguson et al., Nature Materials, vol. 1, Sep. 2002, pp. 26-33.

"A Novel Schottky / 2-DEG Diode for Millimeter- and Submillimeter-Wave Multiplier Applications," W. C. B. Peatman et al. IEEE Electron Device Letters, vol. 13, No. 1, Jan. 1992, pp. 11-13.

"Plasma Wave Electronics: Novel Terahertz Devices Using Two Dimensional Electron Fluid," M. Dyakonov et al., IEEE Transactions on Electron Devices, vol. 43, No. 10, Oct. 1996, pp. 1640-1645.

"A Schottky/2-DEG Varactor Diode for Millimeter and Submillimeter Wave Multiplier Applications," W. C. B. Peatman et al., The Third International Conference on Space THz Technology, Ann Arbor, MI, Mar. 24-26, 1992, pp. 1-17.

"Narrow Channel 2-D MESFET for Low Power Electronics," W. C. B. Peatman et al., IEEE Transactions on Electron Devices, vol. 42, No. 9, Sep. 1995, pp. 1569-1573.

"Plasma Wave Electronics for Terahertz Applications," M. Dyakonov et al., Terahertz Sources and Systems, NATO Science Series II, Mathematics, Physics and Chemistry, vol. 27, 2001.

"Resonant Detection and Frequency Multiplication of Terahertz Radiation Utilizing Plasma Waves in Resonant-Tunneling Transistors," V. Ryzhii et al., Journal of Applied Physics, vol. 88, No. 5, Sep. 2000, pp. 2868-2871.

"Terahertz Photomixing in Quantum Well Structures Using Resonant Excitation of Plasma Oscillations," V. Ryzhii et al., Journal of Applied Physics, vol. 91, No. 4, Feb. 2002, pp. 1875-1881.

"The Ballistic Nano-Transistor," G. Timp et al., IEDM Technical Digest, 1999, pp. 55-58.

"Transistor Characteristics of 14-nm-Gate-Length EJ-MOSFET's," H. Kawaura et al., IEEE Transactions on Electron Devices, vol. 47, No. 4, Apr. 2000, pp. 856-860.

"Novel Heterodimensional Diodes and Transistors," M. S. Shur et al., Solid-State Electronics, vol. 38, No. 9, 1995, pp. 1727-1730.

"Comparison of 2-D and 3-D Side-Gated FETs," M. J. Hurt et al., Proceedings of International Semiconductor Device Research Symposium, vol. 1, Charlottesville, VA, ISBN 1-880920-04-4, Dec. 1995, pp. 79-82.

"Two Dimensional Electrons in Field Effect Transistors," M. S. Shur et al., International Journal of High Speed Electronics and Systems, vol. 9, No. 1, Mar. 1998, pp. 65-99.

"Ballistic Transport in Semiconductor at Low Temperatures for Low-Power High-Speed Logic," M. S. Shur et al., IEEE Transactions on Electron Devices, vol. Ed-26, No. 11, Nov. 1979, pp. 1677-1683.

"Low Ballistic Mobility in Submicron High Electron Mobility Transistors," M. S. Shur, IEEE EDL, vol. 23, No. 9, Sep. 2002, pp. 511-513.

* cited by examiner

METHOD OF RADIATION GENERATION AND MANIPULATION

REFERENCE TO PRIOR APPLICATION

The current application claims priority to co-pending provisional application Ser. No. 60/461,100, filed on Apr. 8, 2003 and incorporated herein by reference.

BACKGROUND OF THE INVENTION

1. Technical Field

The invention relates generally to the generation and manipulation of radiation, and more specifically to a method of managing radiation using a semiconducting device.

2. Related Art

Currently, neither electronic nor photonic devices generate radiation having a frequency within the terahertz range. As a result, this range of frequencies is often called the "terahertz gap." For example, the upper frequency that can be attained using electronic transistors is limited by the transit time of carriers under the gate (for a field effect transistor) or across the base and collector depletion region (for a bipolar junction transistor). While the feature sizes of these devices can be scaled to obtain device parameters close to the terahertz gap (i.e., frequencies of a few hundred gigahertz), fundamental physics limitations, such as the size of the gate length versus the wave length of the terahertz radiation, lead to diminishing returns provided by further scaling. Photonic devices have been created that approach the terahertz gap using interband or intersubband transitions. However, these devices must operate at cryogenic temperatures due to the smaller quanta of terahertz radiation versus thermal energy at room and liquid nitrogen temperatures.

As an alternative approach, plasma waves have been used to generate radiation in the terahertz gap. Plasma waves are oscillations of electron density in time and space. The properties of plasma waves are dependent on the electron density and the dimension and geometry of the electronic system. In a gated two-dimensional electron gas, for example, the velocity of the plasma waves is proportional to the square root of the electron sheet density. In deep submicron field effect transistors, typical plasma waves have frequencies in the terahertz range and do not involve any quantum transitions. Further, the electron transit time may become smaller than the electron momentum relaxation time, causing the electron transport to approach a ballistic mode of transport.

Devices having a ballistic mode of transport exhibit two characteristics. In low electric fields, the effective electron mobility in short channel (i.e., submicron) devices may be substantially smaller than the electron mobility in long channel devices. In high electric fields, electron velocity is higher than in a collision dominated device, and the bulk plasma oscillations may lead to space oscillations of the electron density. When the plasma frequency multiplied by the electron momentum relaxation time is greater than one, a channel of a field effect transistor can act as a resonant cavity for the plasma waves. However, current devices have been unable to overcome the electron energy loss in a ballistic device due to the contacts of the device.

As a result, a need exists for a method of generating and manipulating radiation using a semiconducting device that allows for a larger gate length and/or successfully overcomes the electron energy loss due to the contacts of the device.

SUMMARY OF THE INVENTION

The invention provides a method of managing radiation using a semiconducting device. In particular, radiation having a frequency in the microwave and/or terahertz ranges can be generated, adjusted, and/or detected by adjusting a voltage applied to the semiconducting device. The semiconducting device has an active layer that includes a two-dimensional carrier gas (electron or hole) that is excited using a laser pulse. The laser pulse can be shone on the semiconducting device at various locations. The laser pulse excites a plasma wave in the two-dimensional carrier gas that generates radiation. Characteristics of the two-dimensional carrier gas are modified by adjusting the applied voltage, which in turn adjusts the frequency of the radiation generated by the device. The frequency of the radiation can further be adjusted by modifying various physical parameters of the semiconducting device.

A first aspect of the invention provides a method of managing radiation, the method comprising: providing a semiconducting device having a two-dimensional carrier gas; exciting the carrier gas using a laser pulse having a duration of approximately one to three hundred femtoseconds; and adjusting a frequency of the radiation using a voltage applied to the semiconducting device.

A second aspect of the invention provides a method of generating radiation using a field effect transistor, the method comprising: shining a laser pulse onto the field effect transistor; and adjusting a frequency of the radiation by adjusting a carrier density of carriers in a channel of the field effect transistor.

A third aspect of the invention provides a method of generating radiation using a heterodimensional diode, the method comprising: shining a laser pulse onto at least one of a top side and a bottom side of the heterodimensional diode; and adjusting a frequency of the radiation using a voltage applied to the heterodimensional diode.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

It is understood, that for purposes of this description Al means Aluminum, Ga means Gallium, N means Nitrogen, In means Indium, Si means Silicon, O means Oxygen, C means Carbon, As means Arsenic, Li means Lithium, Nb means Niobium, Ge means Germanium, Sb means Antimony, and P means Phosphorus. Further, it is understood that "group III elements" comprise the elements Al, Ga, In, Boron (B), and Thallium (Ti), and "group IV elements" comprise the elements C, Si, Ge, Tin (Sn), and Lead (Pb). Still further, it is understood that "terahertz radiation" comprises radiation having a frequency between approximately 0.1 and 100 terahertz ($10^{12}$ hertz), and "microwave radiation" comprises radiation having a frequency between approximately 1 and 100 gigahertz ($10^9$ hertz).

The invention provides a method of managing radiation using a semiconducting device. In particular, radiation having a frequency in the microwave and/or terahertz ranges can be generated, adjusted, and/or detected by adjusting a voltage applied to the semiconducting device. The semiconducting device has an active layer that includes a two-dimensional carrier gas (electron or hole) that is excited using a laser pulse. The laser pulse can be shone on the semiconducting device at various locations. The laser pulse excites a plasma wave in the two-dimensional carrier gas that generates radiation. Characteristics of the two-dimensional carrier gas are modified by adjusting the applied voltage, which in turn adjusts the frequency of the radiation generated by the device. The frequency of the radiation can further be adjusted by modifying various physical parameters of the semiconducting device.

Figure 1:
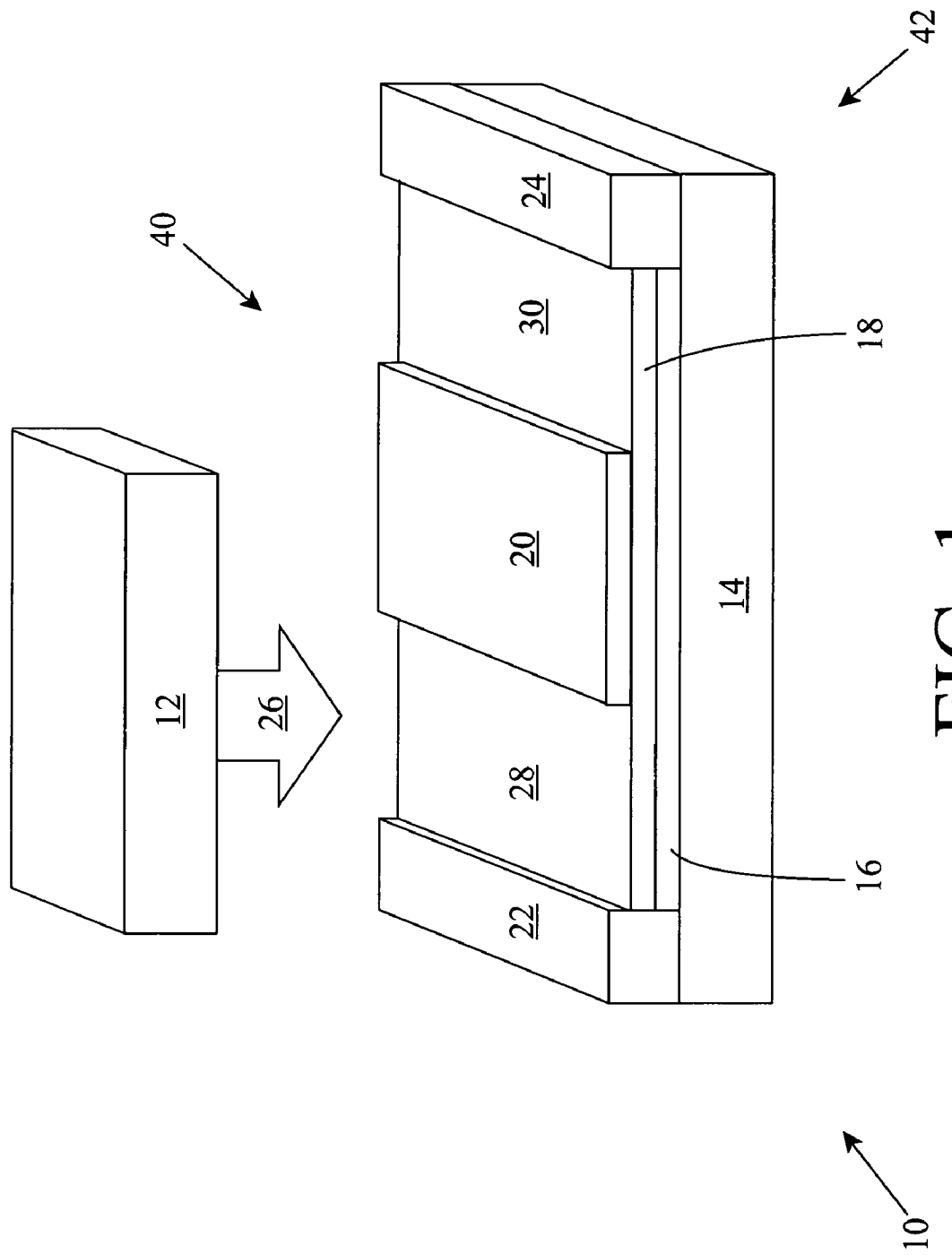
FIG. 1 shows an illustrative embodiment of a field effect transistor having a laser pulse shone onto a gate-source spacing according to one aspect of the invention.

Turning to the Figures, FIG. 1 shows a semiconducting device 10 and a laser 12. Device 10 is configured to operate as a field effect transistor, and includes a substrate 14, an active layer 16, a barrier layer 18, a gate 20, a source contact 22, and a drain contact 24. Device 10 includes a "top" side 40 and an opposing "bottom" side 42. Top side 40 comprises the side of device 10 that includes gate 20 and/or one or more contacts 22, 24, while bottom side 42 comprises the side of device 10 that is closer to substrate 14, opposite the side that includes gate 20 and/or contacts 22, 24. In one embodiment, device 10 comprises a GaAs-based high electron mobility transistor (HEMT) in which substrate 14 comprises p-type GaAs, active layer 15 comprises an epitaxial GaAs layer, and barrier layer 18 comprises AlGaAs. Further, gate 20 can comprise a 0.1 micrometer ($10^{-6}$ meters) gate, and a gate-to-source and a gate-to-drain spacing can comprise one micrometer each. Device 10 can be manufactured using any approach now known or later developed, and may include one or more additional layers and/or contacts not shown.

It is understood that device 10 can include any type of substrate 14. For example, substrate 14 can comprise GaAs, InP, sapphire, SiC, spinel, silicon, bulk GaN, bulk AlN, bulk AlGaN, LiGaO$_2$, LiNbO$_3$, or the like. Active layer 16 can comprise an active layer having a two-dimensional carrier gas (electron or hole). As such, active layer 16 can comprise any compound capable of including the two-dimensional carrier gas, including, for example, Si, SiGe, Ge, AlGaAs, GaAs, AlN, GaN, InN, AlInAs, InSb, InP, etc. Barrier layer 18 can also comprise any compound capable of insulating active layer 16 from gate 20, including, for example, SiO$_2$, SiN, a binary, ternary, or quaternary compound that includes one, two, or three group III elements, respectively, and N or a group IV element, a compound that includes elements of groups II and VI, or a combination of layers of different compositions.

Figure 2:
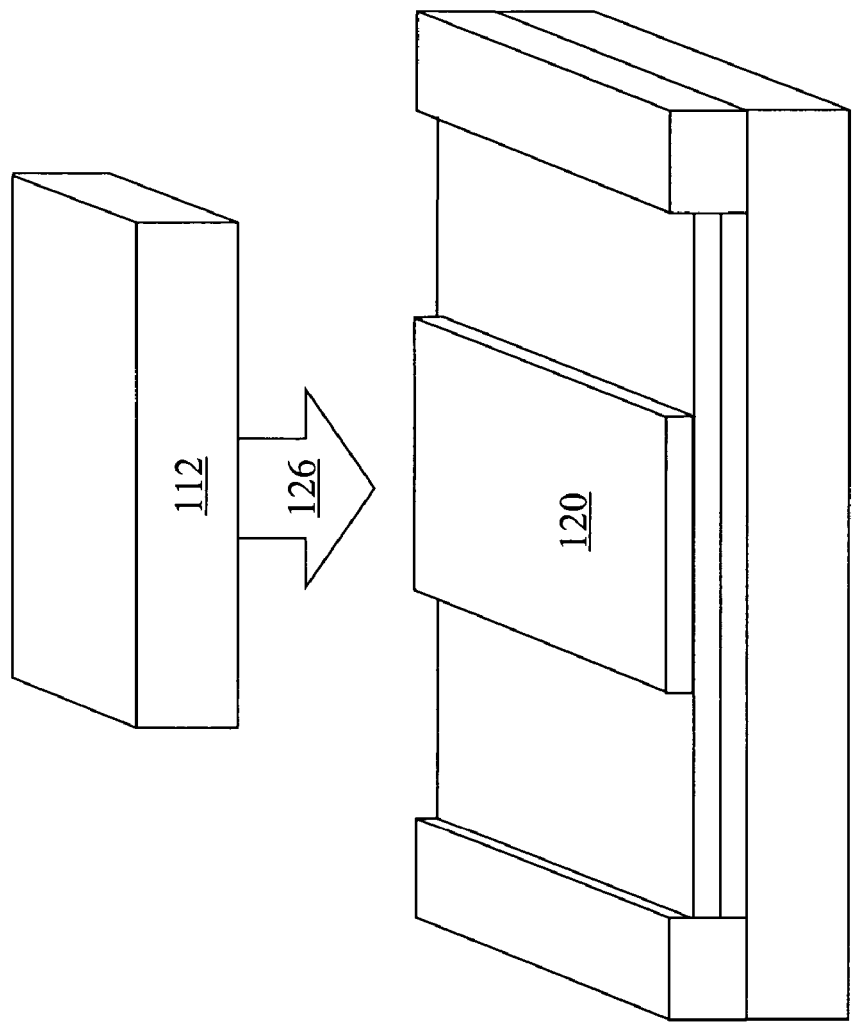
FIG. 2 shows an alternative embodiment of a field effect transistor having a laser pulse shone onto a gate.
Figure 3:
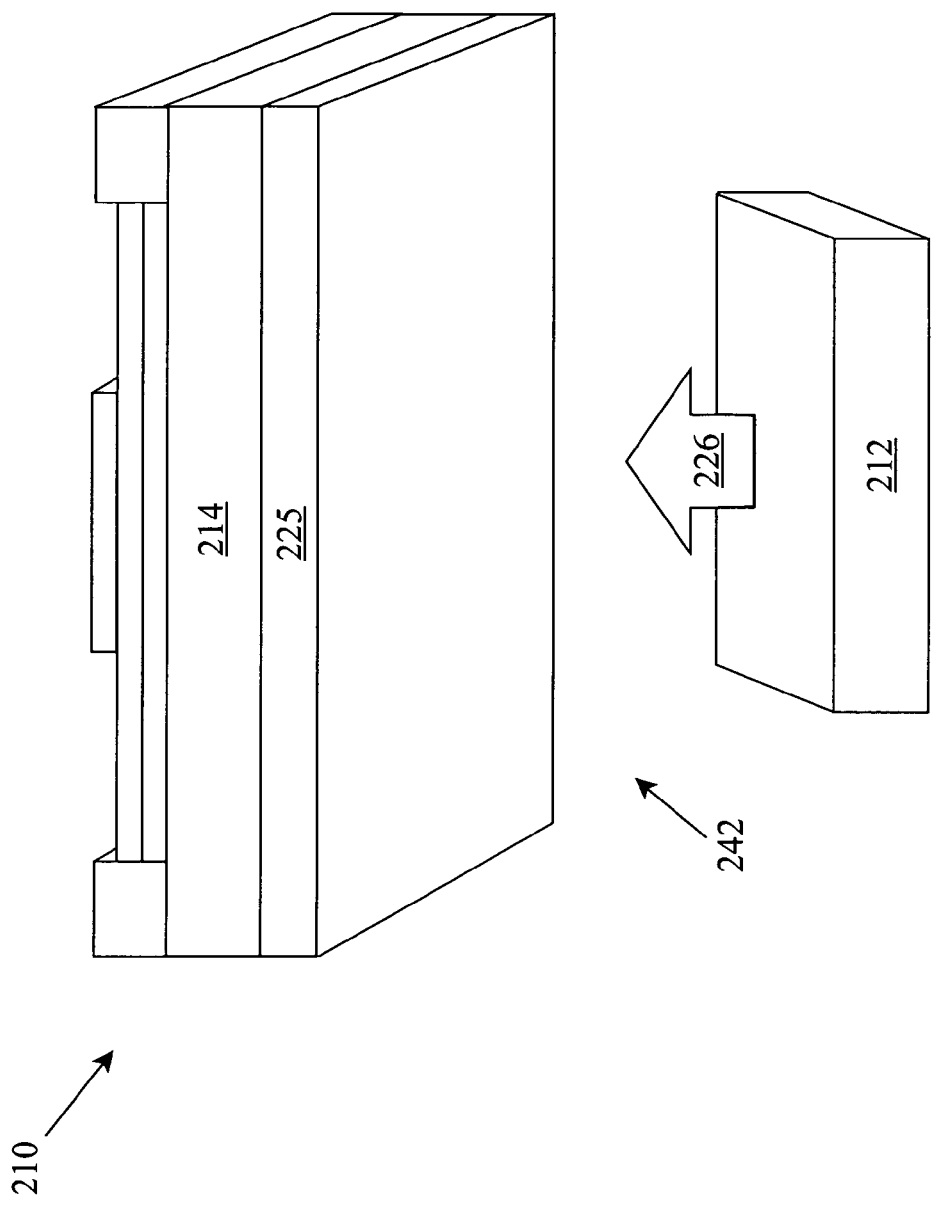
FIG. 3 shows another alternative embodiment of a field effect transistor having a laser pulse shone onto a substrate.

Laser 12 generates a laser pulse 26 that excites the carrier gas in device 10. In one embodiment, laser pulse 26 has a duration of approximately twenty femtoseconds and a photon energy that exceeds 1.42 electron Volts (eV). However, it is understood that the duration of laser pulse 26 can vary within a range of approximately one femtosecond to approximately ten picoseconds. Laser 12 is shown positioned so that laser pulse 26 shines onto top side 40 of device 10, and in particular, on a gate-source spacing 28 of barrier layer 18. Alternatively, laser pulse 26 can be shone onto a gate-drain spacing 30 of barrier layer 18 on device 10, or simultaneously shone onto both gate-source spacing 28 and gate drain spacing 30. Further, FIG. 2 shows a laser 112 that is positioned to shine a laser pulse 126 onto a gate 120 of a device 110. In this embodiment, gate 120 can comprise a material that allows laser pulse 126 to pass through it (i.e., is transparent). FIG. 3 shows yet another alternative embodiment, in which a laser 212 is positioned to shine a laser pulse 226 onto bottom side 242 of device 210. As shown, device 210 can include a substrate contact 225 onto which laser pulse 226 is shown. Alternatively, laser pulse 226 could be shown directly on substrate 214. It is understood that one or more lasers can be used simultaneously or alternatively to excite the carrier gas in the device. As a result, the invention is not limited to the configuration and/or number of lasers shown and discussed in the illustrative embodiments.

Returning to FIG. 1, laser pulse 26 has a photon energy that is sufficient to cause a band-to-band or impurity-to-band transition, e.g., in excess of 1.42 eV, thereby abruptly changing the conductivity of the illuminated region(s) of device 10. This results in exciting plasma oscillations in device 10. Active layer 16 serves as a resonant cavity that traps these plasma oscillations as plasma waves. This contrasts with conventional approaches in which a femtosecond laser pulse is used to excite a semiconductor leading to the generation of broadband radiation. In any event the resulting radiation can have a frequency in the microwave range, the terahertz range, or both.

The frequency and/or amplitude of the radiation can be manipulated using various methods. For example, when device 10 includes a gate 20, the frequency of the plasma waves is proportional to the length of gate 20. Further, the frequency of the plasma waves is also proportional to the square root of a carrier density in the active layer 16 (i.e., channel). In an n-channel transistor, the carriers comprise electrons, while in a p-channel transistor, the carriers comprise holes. In either case, since the carrier density can be adjusted by applying a voltage to device 10, the frequency of the plasma waves is also approximately proportional to the square root of the voltage difference between a threshold voltage and a voltage applied to gate 20. In other words, changing the bias voltage at gate 20 and/or the length of gate 20 adjusts the frequency of the plasma waves which also adjusts the frequency of the radiation.

The frequency and/or amplitude of the radiation can also be manipulated by adjusting a voltage applied to device 10. For example, adjusting a bias of the voltage applied to drain contact 24 of device 10 also alters the propagation and boundary conditions for the plasma waves. Changes to the propagation and boundary conditions for the plasma waves result in changes to the amplitude and frequency of the radiation generated by device 10. Consequently, adjusting the bias of the voltage applied to drain contact 24 also adjusts the frequency and amplitude of the radiation generated by device 10.

Figure 4:
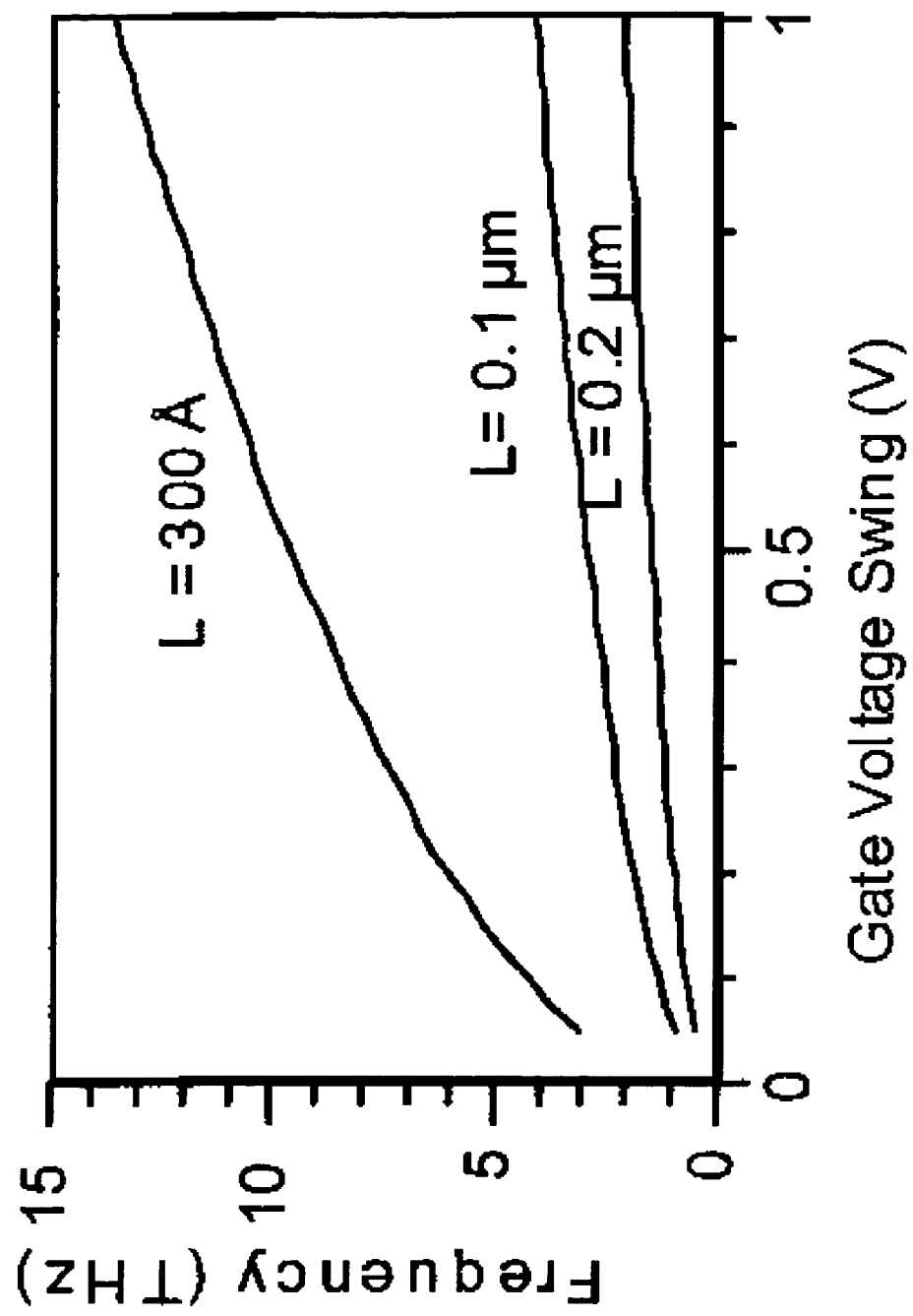
FIG. 4 shows the frequency of the plasma waves as a function of bias voltage for various field effect transistors configured as shown in FIG. 1 and having different gate lengths.

The relationship between gate length, bias voltage, and plasma wave frequency is shown in FIG. 4. In FIG. 4, plasma wave frequency (vertical) is plotted as a function of bias voltage (horizontal) for various field effect transistors configured as shown in FIG. 1. Each field effect transistor included an active layer comprising GaAs, and a barrier layer comprising AlGaAs and had a unique gate length (L). The field effect transistors had gates having lengths of 0.2 micrometers, 0.1 micrometers, and 300 Angstroms ($10^{-10}$ meters). A bias voltage was applied to the gate in each field effect transistor, and the frequency of the plasma waves was measured. As can be seen in FIG. 4, a shorter gate length yielded a higher plasma frequency, and a higher bias voltage (i.e., gate voltage swing) also yielded a higher plasma frequency.

Figure 5:
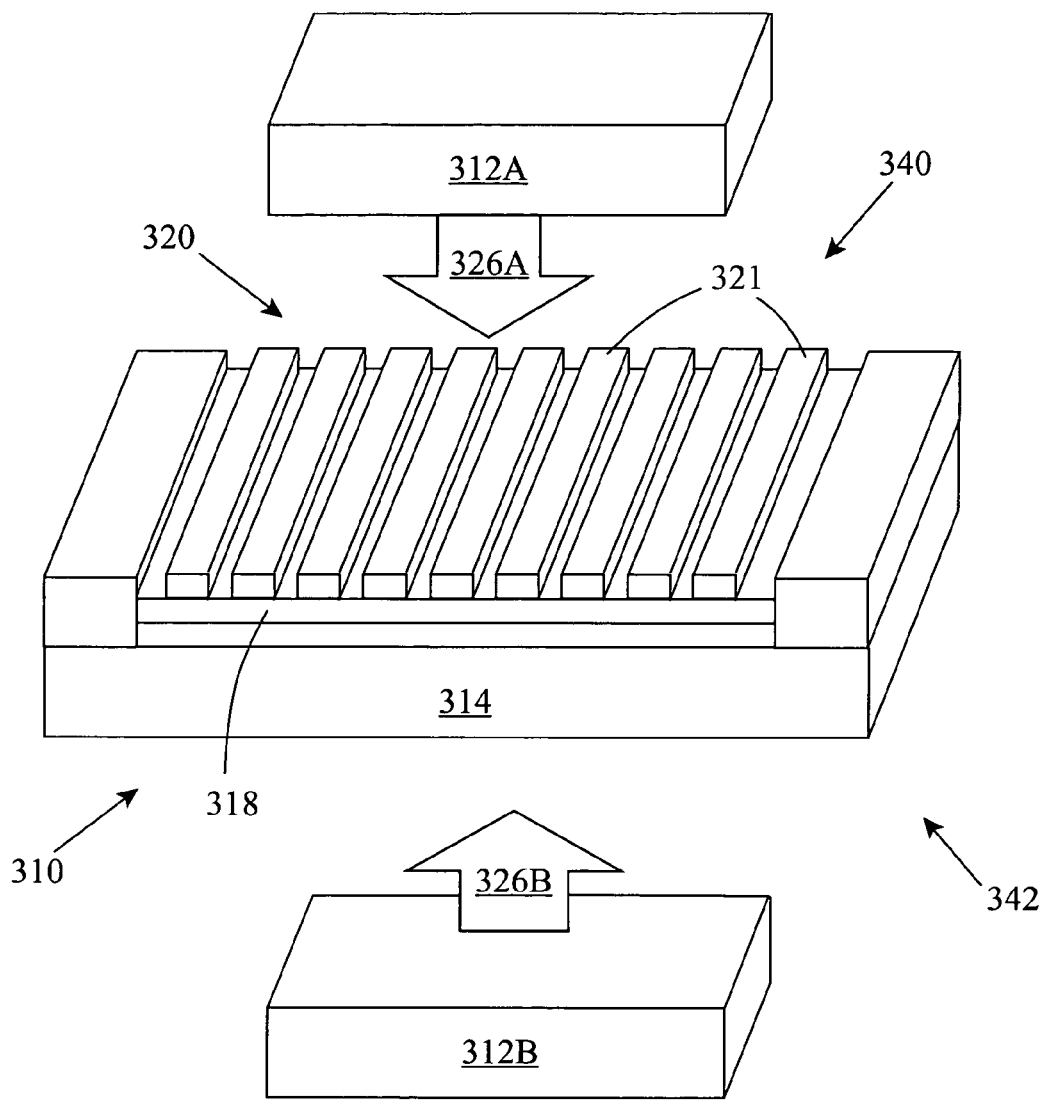
FIG. 5 shows yet another alternative embodiment of a field effect transistor having a periodic grating gate and being illuminated by two lasers.

FIG. 5 shows an alternative embodiment in which device 310 comprises a field effect transistor having a periodic grating gate 320. Periodic grating gate 320 comprises a plurality of gate fingers 321 disposed on a barrier layer 318. Device 310 is illuminated by two lasers 312A, 312B disposed to shine onto a top side 340 and bottom side 342 of device 310, respectively. In particular, laser 312A is disposed to emit a pulse 326A of laser radiation onto periodic grating gate 320 and barrier layer 318, and laser 312B is disposed to emit a pulse 326B of laser radiation onto a substrate 314 of device 310. In this embodiment, the frequency of the plasma waves is proportional to the length of each gate finger 321. Use of periodic grating gate 320 allows the size of device 310 to be comparable to the wavelength of the terahertz and/or microwave radiation, which allows device 310 to generate the radiation in a more efficient manner.

Figure 6:
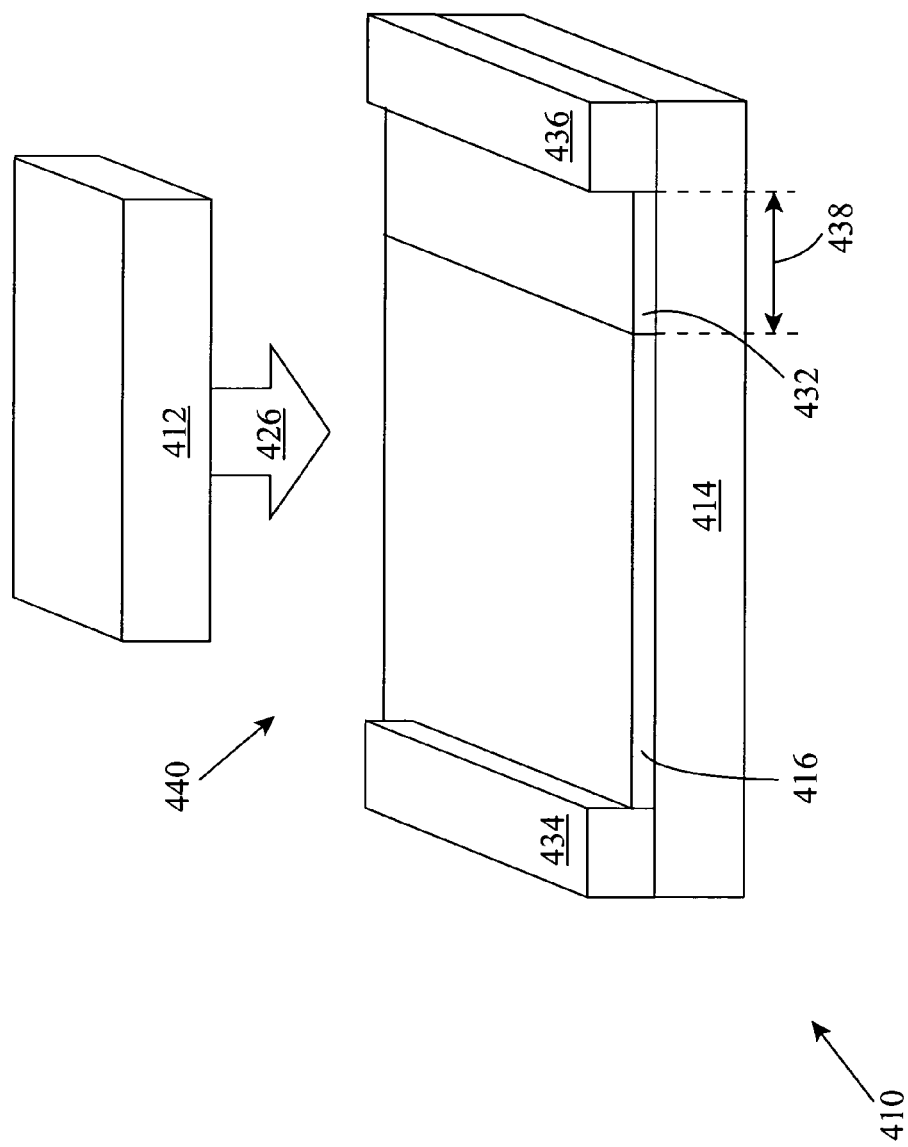
FIG. 6 shows an illustrative embodiment of a heterodimensional diode according to one aspect of the invention.

FIG. 6 shows an alternative embodiment in which device 410 comprises a heterodimensional diode. The heterodimensional diode comprises a substrate 414, and an ungated active layer 416. Active layer 416 includes a two-dimensional carrier gas (electron or hole), and is bounded by a contact on one side and a second contact on another side. In this case, active layer 416 is bounded by an ohmic contact 434, and a rectifying contact 436. In one embodiment, device 10 comprises a GaAs-based heterodimensional diode in which substrate 414 comprises a GaAs substrate and active layer 416 comprises a GaAs epitaxial layer. Further, device 410 can include a 0.25 micrometer spacing between contacts 434, 436. Rectifying contact 436 can comprise a Schottky contact or any contact that forms a p-n junction with the two-dimensional carrier gas in active layer 416 resulting in the formation of a depletion region 432 in active layer 416. Laser 412 is shown configured to shine a laser pulse 426 onto a top side 440 of device 410, and in particular, active layer 416. In this embodiment, the frequency of the plasma waves and, as a result, the frequency of the radiation can be adjusted by adjusting a width 438 of depletion region 432. Width 438 of depletion region 432 is proportional to the difference between a bias voltage applied to rectifying contact 436 and a constant voltage that is dependent on the physical properties of rectifying contact 436. As a result, changing the bias voltage applied to rectifying contact 436 adjusts the frequency of the radiation.

Figure 7:
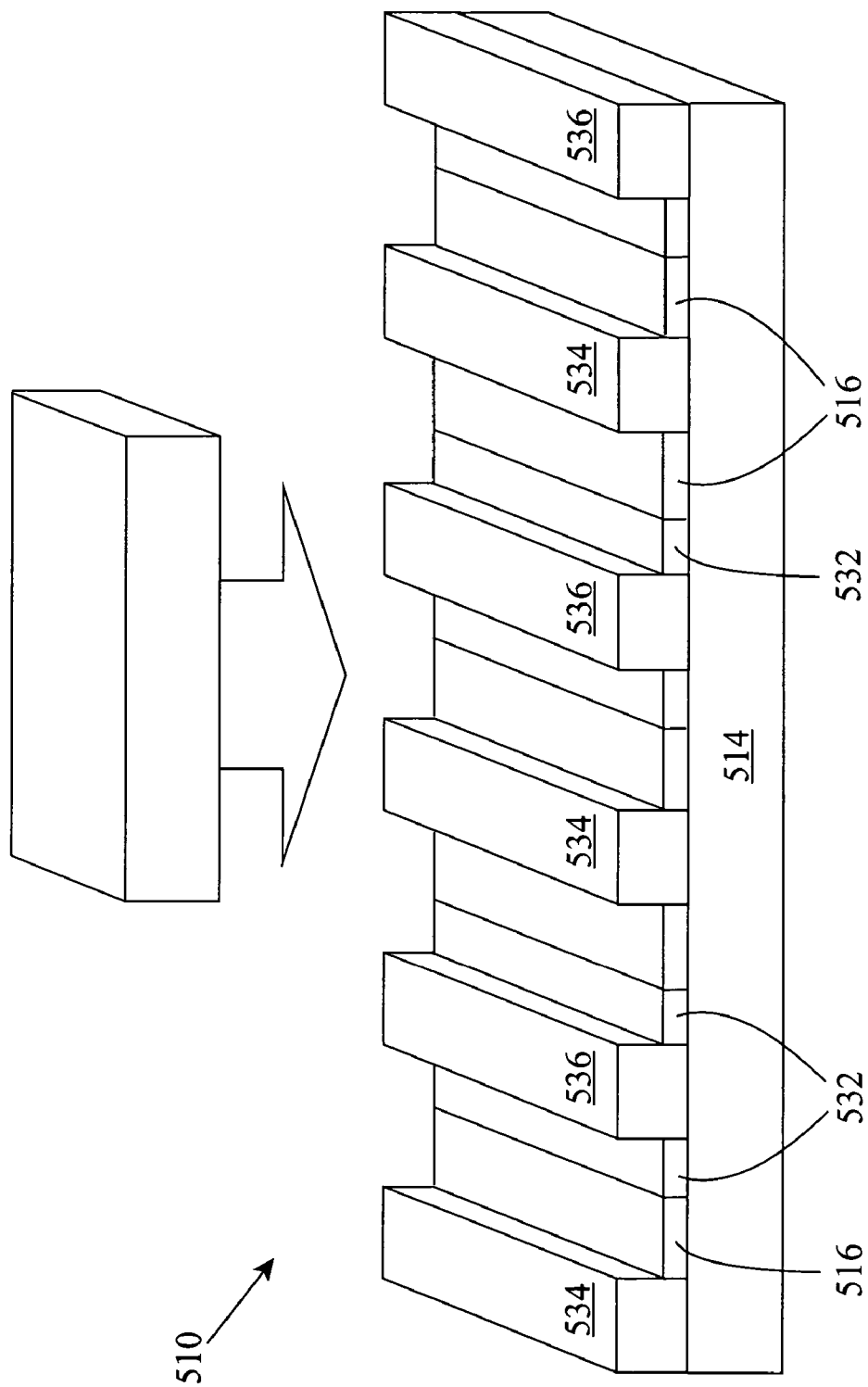
FIG. 7 shows an illustrative embodiment of an array of heterodimensional diodes according to another aspect of the invention.

FIG. 7 shows an illustrative embodiment of a device 510 configured as an array of heterodimensional diodes in which ohmic contacts 534 and rectifying contacts 536 are placed in alternating positions on substrate 514. As a result, a plurality of active layers 516 are formed that are each bounded by an ohmic contact 534 and a rectifying contact 536. As discussed previously with reference to FIG. 6, each rectifying contact 536 forms a depletion region 532 in a portion of the active layer 516 that is closest to the rectifying contact 536. A width of the depletion region 532 is adjusted by adjusting a bias voltage applied to each rectifying contact 436. This results in an adjustment to the frequency of the radiation.

Figure 8:
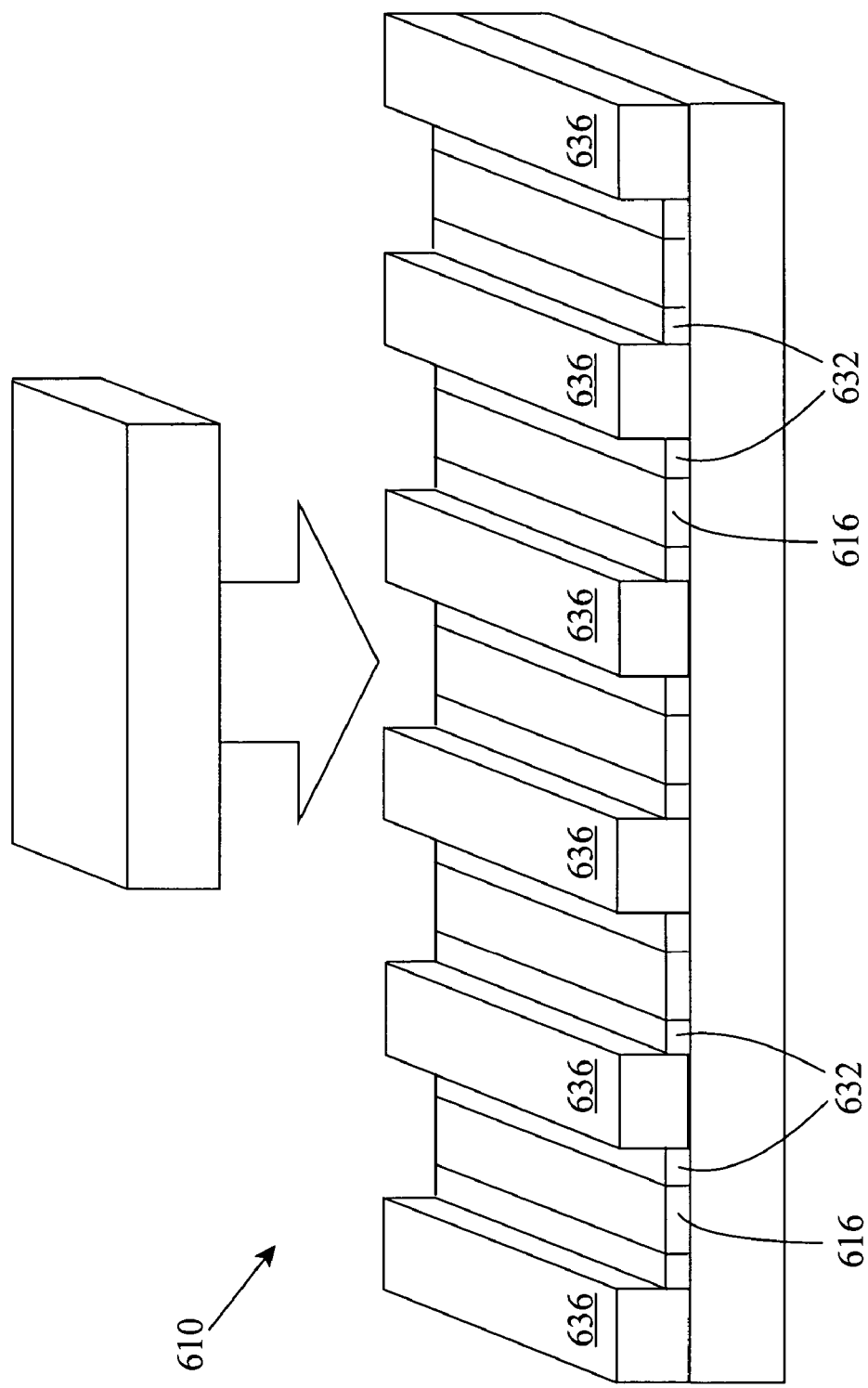
FIG. 8 shows an alternative embodiment of an array of heterodimensional diodes according to yet another aspect of the invention.

FIG. 8 shows yet another illustrative embodiment of a device 610 configured as an array of heterodimensional diodes in which a plurality of active layers 616 are bounded on two sides by rectifying contacts 636. Although both device 510 (FIG. 7) and device 610 comprise the same number of contacts, similar adjustments in a bias voltage applied to the rectifying contacts 636 of device 610 result in greater adjustments to the frequency of the radiation compared to device 510 since additional depletion regions 632 are formed in active layers 616.

When an array of devices (i.e., diodes, field effect transistors, etc.) is used, it is understood that the same voltage can be applied to the various contacts or two or more different voltages can be applied to the various contacts. While the arrays of devices are shown having a particular number and configuration of contacts, it is understood that these are presented for illustrative purposes only. A device can include any number and/or configuration of contacts according to the invention.

While various aspects of the invention have been discussed in terms of generating radiation having a desired frequency, the teachings of the invention are not limited to generating radiation, but apply to all aspects of managing radiation. For example, it is understood that the teachings of the invention can readily be applied to detecting, mixing, and/or frequency multiplication of radiation having a particular frequency. In order to implement one of these applications, it may be necessary to subject the semiconductor device to electromagnetic radiation from a local oscillator.

The foregoing description of various embodiments of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of managing radiation, the method comprising:
   providing a semiconducting device having a two-dimensional carrier gas, wherein the semiconducting device comprises at least one of: a heterodimensional diode, a field effect transistor array, a heterodimensional diode array, or an array of rectifying contacts;
   exciting the carrier gas by generating a laser pulse with a laser and shining the laser pulse directly onto the semiconducting device, wherein the laser pulse has a duration of approximately twenty femtoseconds; and
   adjusting a frequency of the radiation to a desired frequency using a voltage applied to the semiconducting device.

2. The method of claim 1, wherein the radiation comprises at least one of: terahertz radiation or microwave radiation.

3. The method of claim 1, wherein the adjusting adjusts at least one of: a gate bias voltage or a drain bias voltage.

4. The method of claim 1, wherein the exciting includes shining the laser pulse onto at least one of: a top side or a bottom side of the semiconducting device.

5. The method of claim 1, wherein a photon energy of the laser pulse exceeds 1.42 electron Volts.

6. A method of generating radiation using a field effect transistor, the method comprising:
generating a laser pulse having a duration of approximately twenty femtoseconds with a laser and shining the laser pulse directly onto at least one of: a gate-source spacing, a gate, a gate-drain spacing, or a substrate of the field effect transistor; and
adjusting a frequency of the radiation to a desired frequency by adjusting a carrier density of carriers in a channel of the field effect transistor, wherein the adjusting includes adjusting a gate length for the gate.

7. A method of generating radiation using a field effect transistor, the method comprising:
generating a laser pulse having a duration of approximately twenty femtoseconds with a laser and shining the laser pulse directly onto the field effect transistor; and
adjusting a frequency of the radiation to a desired frequency by adjusting a carrier density of carriers in a channel of the field effect transistor, wherein the field effect transistor comprises a transparent gate, and wherein the laser pulse is shone onto the transparent gate.

8. A method of generating radiation using a field effect transistor, the method comprising:
generating a laser pulse having a duration of approximately twenty femtoseconds with a laser and shining the laser pulse directly onto the field effect transistor; and
adjusting a frequency of the radiation to a desired frequency by adjusting a carrier density of carriers in a channel of the field effect transistor, wherein the adjusting uses a bias voltage applied to a periodic grating gate of the field effect transistor.

9. A method of generating radiation using a field effect transistor, the method comprising:
generating a laser pulse having a duration of approximately twenty femtoseconds with a laser and shining the laser pulse directly onto at least one of: a gate-source spacing, a gate, a gate-drain spacing, or a substrate of the field effect transistor; and
adjusting a frequency of the radiation to a desired frequency by adjusting a carrier density of carriers in a channel of the field effect transistor, wherein the radiation comprises at least one of: terahertz radiation or microwave radiation.

10. A method of generating radiation using a field effect transistor, the method comprising:
generating a laser pulse with a laser and shining the laser pulse directly onto at least one of: a gate-source spacing, a gate, a gate-drain spacing, or a substrate of the field effect transistor; and
adjusting a frequency of the radiation to a desired frequency by adjusting a carrier density of carriers in a channel of the field effect transistor, wherein the laser pulse has a duration of approximately twenty femtoseconds.

11. The method of claim 10, wherein the shining excites plasma oscillations and wherein an active layer in the field effect transistor traps the plasma oscillations as plasma waves.

12. A method of generating radiation using a heterodimensional diode, the method comprising:
generating a laser pulse having a duration of approximately twenty femtoseconds with a laser and shining the laser pulse directly onto at least one of a top side or a bottom side of the heterodimensional diode; and
adjusting a frequency of the radiation to a desired frequency using a voltage applied to the heterodimensional diode to adjust a frequency of a plasma wave in a two-dimensional carrier gas in the heterodimensional diode.

13. The method of claim 12, further comprising adjusting the frequency of the radiation by using a plurality of heterodimensional diodes.

14. The method of claim 12, wherein the shining shines the laser pulse onto at least one of: a gate, an active layer, or a barrier layer of the heterodimensional diode, the method further comprising generating a second laser pulse with a second laser and shining the second laser pulse directly onto a substrate of the heterodimensional diode.

15. The method of claim 12, wherein the heterodimensional diode includes at least one ohmic contact and at least one rectifying contact.

16. The method of claim 12, wherein the radiation comprises at least one of: terahertz radiation or microwave radiation.

17. A method of managing radiation, the method comprising:
providing a field effect transistor having a two-dimensional carrier gas and a periodic grating gate;
exciting the carrier gas by generating a laser pulse having a duration of approximately twenty femtoseconds with a laser, and shining the laser pulse directly on the field effect transistor; and
adjusting a frequency of the radiation to a desired frequency using a voltage applied to the field effect transistor.

18. A method of managing radiation, the method comprising:
providing a semiconducting device having a two-dimensional carrier gas, wherein the semiconducting device comprises at least one of: a heterodimensional diode, a field effect transistor array, a heterodimensional diode array, or an array of rectifying contacts;
exciting the carrier gas by shining a laser pulse having a duration of approximately twenty femtoseconds onto the semiconducting device; and
adjusting a frequency of the radiation to a desired frequency using a voltage applied to the semiconducting device.

19. A method of managing radiation, the method comprising:
providing a field effect transistor having a two-dimensional carrier gas and a periodic grating gate;
exciting the carrier gas by generating a laser pulse having a duration of approximately twenty femtoseconds with a laser, and shining the laser pulse directly on the field effect transistor; and
adjusting a frequency of the radiation to a desired frequency using a voltage applied to the field effect transistor, wherein the radiation comprises at least one of: terahertz radiation or microwave radiation.

* * * * *